United States Patent

Nelson et al.

[11] Patent Number: 5,329,898
[45] Date of Patent: Jul. 19, 1994

[54] SHAFT SEAL AND BORE ASSEMBLY

[75] Inventors: John J. Nelson, Novi, Mich.;
Lawrence E. Bell, Kingston, N.H.

[73] Assignee: Freudenerg-NOK General Partnership, Plymouth, Mich.

[21] Appl. No.: 57,612

[22] Filed: May 5, 1993

[51] Int. Cl.⁵ .................................. F02F 7/00
[52] U.S. Cl. ........................ 123/195 C; 277/37; 277/153
[58] Field of Search ............ 123/195 C, 198 E; 277/37, 152, 153

[56] References Cited

U.S. PATENT DOCUMENTS

| | | |
|---|---|---|
| 450,004 | 4/1891 | Daley . |
| 1,720,696 | 7/1929 | Simpson . |
| 2,834,616 | 5/1958 | Gebert et al. ............ 277/37 |
| 2,889,163 | 6/1959 | Stephens et al. ........... 288/3 |
| 3,131,942 | 5/1964 | Ertaud .................. 277/53 |
| 3,355,179 | 11/1967 | McGrew, Jr. ............ 277/134 |
| 3,468,548 | 9/1969 | Webb ................... 277/13 |
| 4,026,563 | 5/1977 | Bainard ................. 277/37 |
| 4,471,963 | 9/1984 | Airhart ................. 277/1 |
| 4,484,751 | 11/1984 | Deuring ............... 123/198 E |
| 4,545,588 | 10/1985 | Nagai et al. ........... 277/935 D |
| 4,560,177 | 12/1985 | Riley, Jr. ............. 277/134 |
| 4,747,603 | 5/1988 | Sugino et al. ........... 277/26 |
| 5,002,289 | 3/1991 | Yasui et al. ........... 277/153 |

FOREIGN PATENT DOCUMENTS 2215786 9/1989 United Kingdom .

Primary Examiner—Noah P. Kamen
Attorney, Agent, or Firm—Dinnin & Dunn

[57] ABSTRACT

An oil seal, and in combination therewith a housing having a bore with a non-continuous groove. The oil seal has a locking or retention rib held within the non-continuous groove and a second sealing rib in compression fit against the sealing surface of the bore.

32 Claims, 4 Drawing Sheets

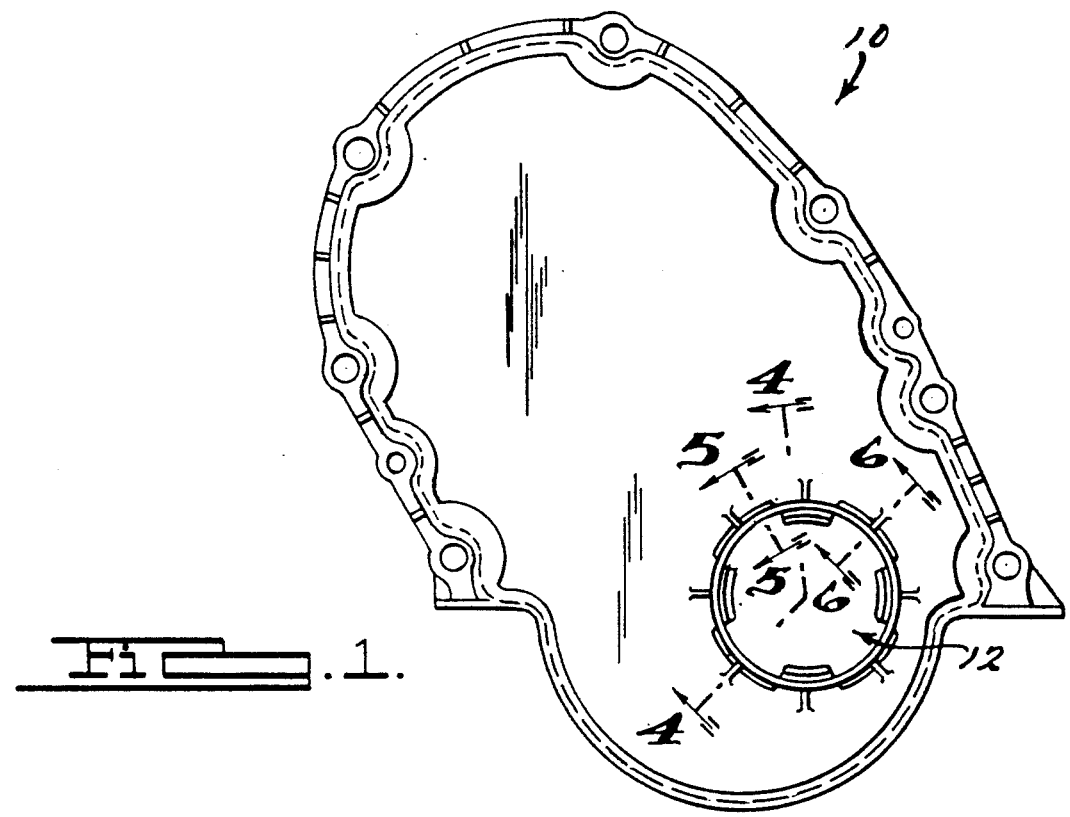
FIG.1.
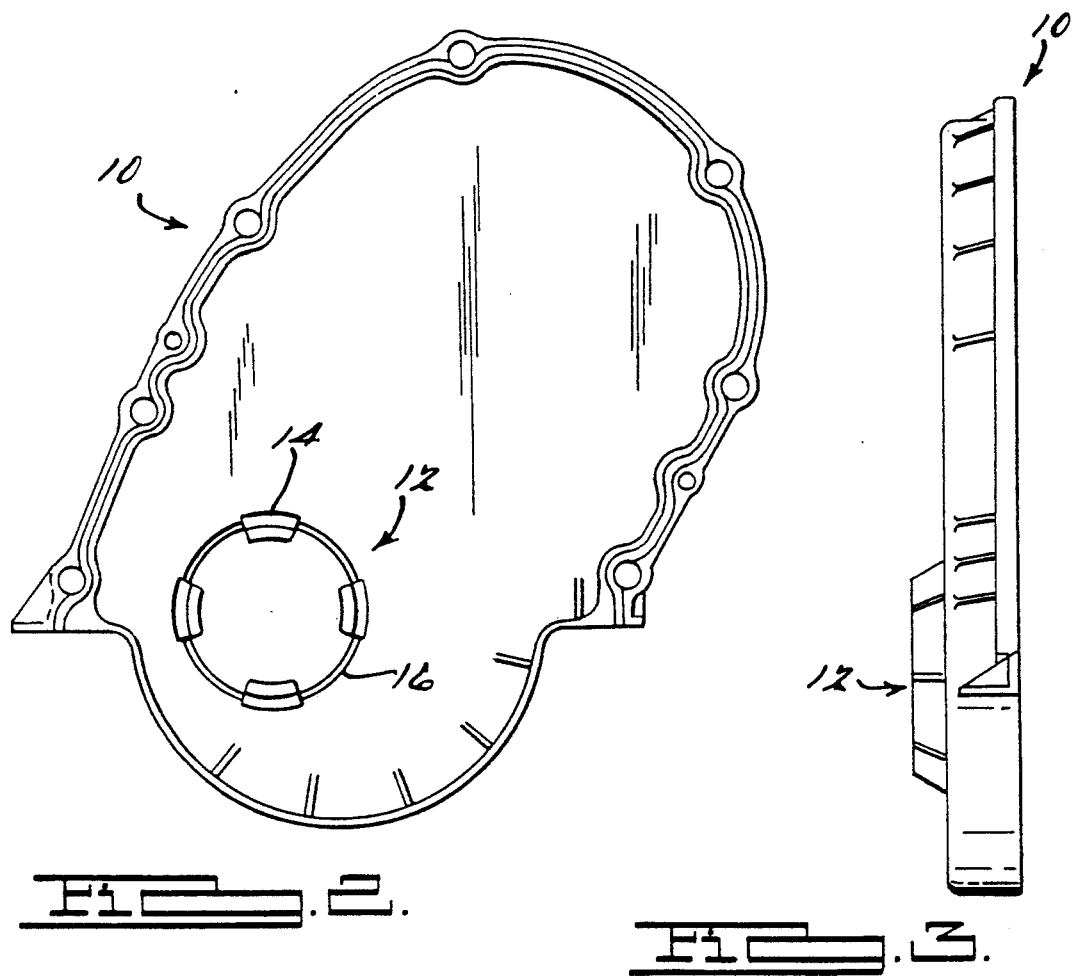
FIG.2.
FIG.3.

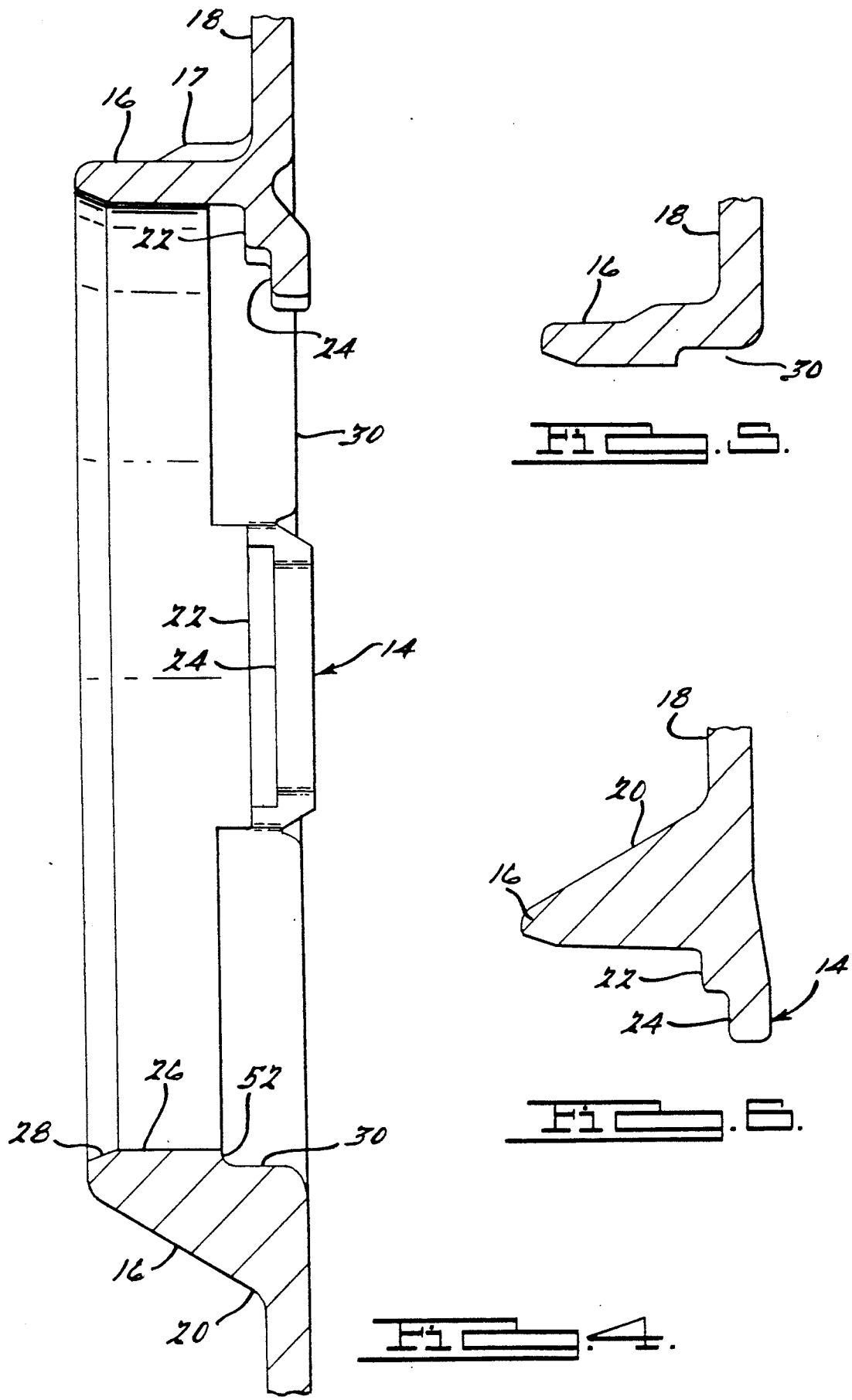

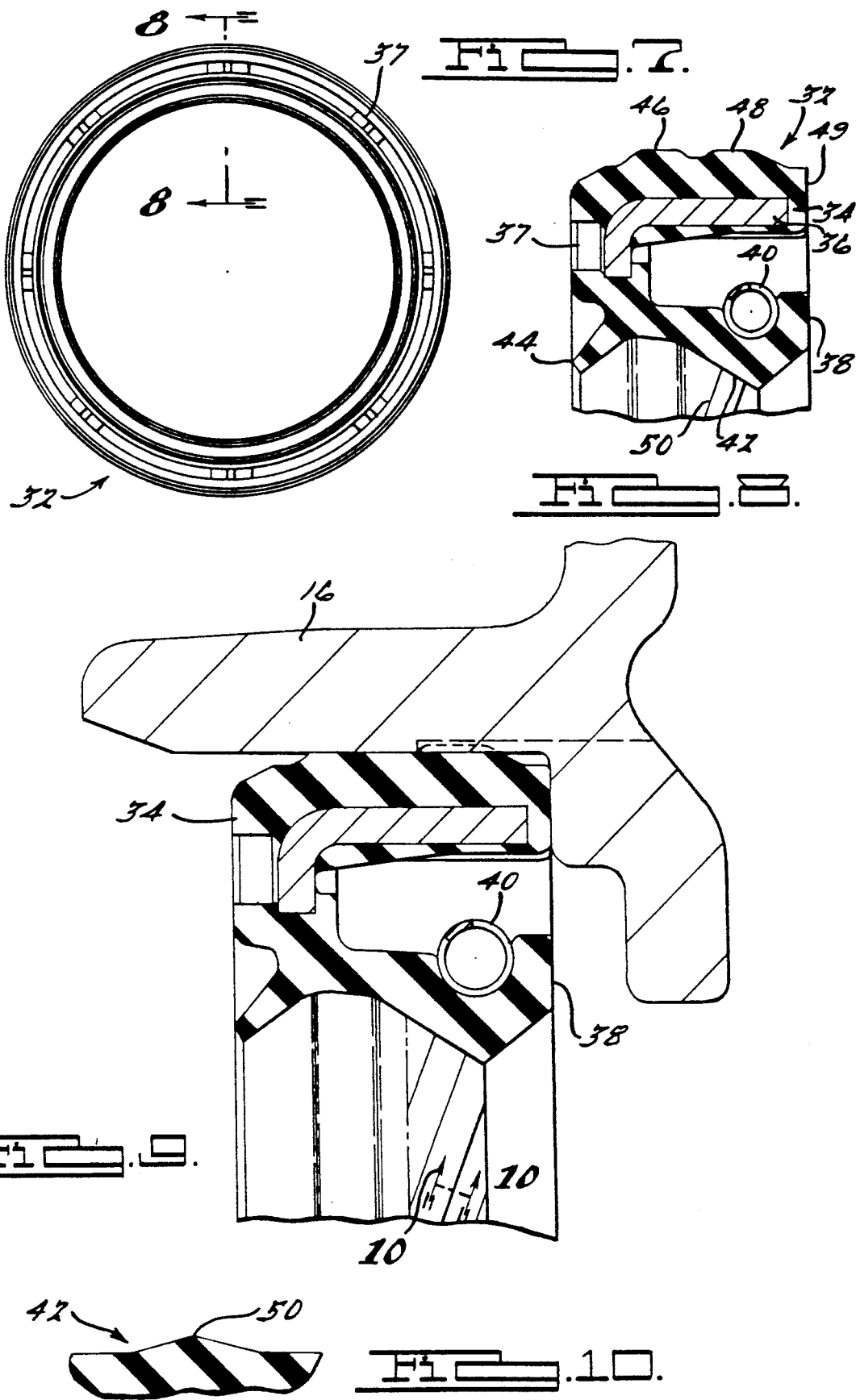

SHAFT SEAL AND BORE ASSEMBLY

BACKGROUND AND SUMMARY OF THE INVENTION

1. Summary of Invention

The present invention relates generally to fluid seals, and more particularly to an oil seal adapted to be fitted in a housing, such as a crank shaft seal within an engine cover.

2. Background of the Invention

It has long been known in the art to use a separate seal member between a cylindrical member such as a crank shaft and a housing containing a liquid environment to maintain a fluid type seal at the point where the cylindrical object extends through the housing. This seal arrangement can be used for a reciprocating piston or for a rotating shaft, and has applications in hydraulic devices and in oil or liquid cooled engines including, as here, automotive engines. The primary design concerns for such seals are fluid tightness, durability, cost and weight. The cost of the seal has become an increasingly important factor, particularly in the automotive industry. There are many factors that affect the cost of the seals, including materials used, the amount of materials used, and the machining or production costs. Further, there are the associated costs in preparing the bore of the housing for receiving the seal. While the weights of the seal and the housing are related to the cost, there is also an important consideration from the standpoint of overall design, particularly in the automotive industry.

One critical design consideration in seal effectiveness is the retention force holding the seal within the housing so that the seal is held without axial or circumferential movement. Such axial or circumferential movement adversely affects the sealing engagement between the seal and the housing. The retention force also directly relates to the durability of the seal. Certain prior art patents have been directed to methods of securing a seal within the housing. U.S. Pat. No. 4,747,603 to Sugino teaches the use of a nitrided metallic reinforcement ring, but the nitriding process is more costly. The nitriding process also increases the installation loads required to install the seal into the housing, which increases the installation time and increases the possibility of installation error or installation damage to the seal or housing U.S. Pat. No 4,560,177 to Riley shows a snap-ring retention device, but requires a wider bore to house the snap ring and requires an added component, the snap ring, which increases the overall system cost. U.K. Patent No. 2,215,786 to Mims teaches a secondary process of sonically welding the seal into the bore, but the secondary process adds cost, and if a replacement seal is required, both the seal and the bore of the housing must be replaced which increases the repair cost. U.S. Pat. No. 2,889,163 to Stephens requires an adhesive to be applied to the seal to bond the seal to the bore of the housing, but requires the additional cost of the adhesive and additional labor cost for applying the adhesive. Further, the labor costs in the Stephens device are increased because the adhesive must be applied carefully in order to be effective, excessive adhesive can extrude onto the seal lip and interfere with the sealing function, whereas too little adhesive may allow for inadequate retention forces. U.S. Pat. No. 4,484,751 to Deuring involves the direct bonding of the sealing lip to the bore of the housing, which requires extensive preparation of the bore for the bonding process and which is difficult to perform at high production rates because of the difficulty in fitting large carriers and covers into mold cavities. Further, if a replacement seal is required, both the seal and the bore must be replaced, increasing the repair cost.

Other attempts to secure the seal within the bore of the housing include U.S. Pat. No. 4,026,563 to Bainard which requires the machining of the groove in the bore diameter of the housing to receive and lock a rib of the seal. This groove is continuous and thus only retains the seal in an axial direction and not in a circumferential direction (rotation). Further, the continuous groove could not be molded in a unitary bore or housing but instead requires a machining or secondary process which increases the cost of preparing the bore of the housing. A similar type of circumferential groove and rib configuration for the bore and seal respectively is shown in U.S. Pat. No. 2,834,616 to Gebert.

Wherefore, it is an objective of the present invention to provide a seal and housing assembly in which the seal is securely retained axially and circumferentially, in which the seal and housing member are as lightweight as possible, and in which the seal and housing are as easily and efficiently produced or manufactured as possible.

It is a further object of the present invention to provide a seal which is securely retained axially and circumferentially but which requires as little installation force as possible and which can be effectively and efficiently repaired or replaced.

It is a further object of the present invention to provide a method of manufacturing a housing for receiving a seal such as a shaft seal which is simply molded or cast and which allows de-flashing without affecting the seal bore sealing area.

3. Summary of the Present Invention

An oil seal, and in combination therewith a housing having a bore with a non-continuous groove. The oil seal has a locking or retention rib held within the non-continuous groove and a second sealing rib in compression fit against the sealing surface of the bore.

BRIEF DESCRIPTION OF THE DRAWINGS

FIG. 1 is a top view of a engine cover containing a port for a crank shaft.

FIG. 2 is a bottom view of the engine cover shown in FIG. 1.

FIG. 3 is a side view of the engine cover shown in FIGS. 1 and 2.

FIG. 4 is a cross-sectional view taken through section A—A of the port of the engine cover according to FIG. 1.

FIG. 5 is a cross-sectional view taken through section B—B of a portion of a port of the engine cover of FIG. 1.

FIG. 6 is a cross-sectional view taken through section C—C of the port of the engine cover of FIG. 1.

FIG. 7 is a top view of a seal according to the present invention.

FIG. 8 is a cross-sectional view taken through section D—D of the seal of FIG. 7.

FIG. 9 is a cross-sectional view of the seal according to the present invention inserted into the port of and in operational relationship with the engine cover according to the present invention.

FIG. 10 is a cross-sectional view taken along section E—E of FIG. 9 of the seal according to the present invention.

DETAILED DESCRIPTION OF THE PREFERRED EMBODIMENT

Figure 11:
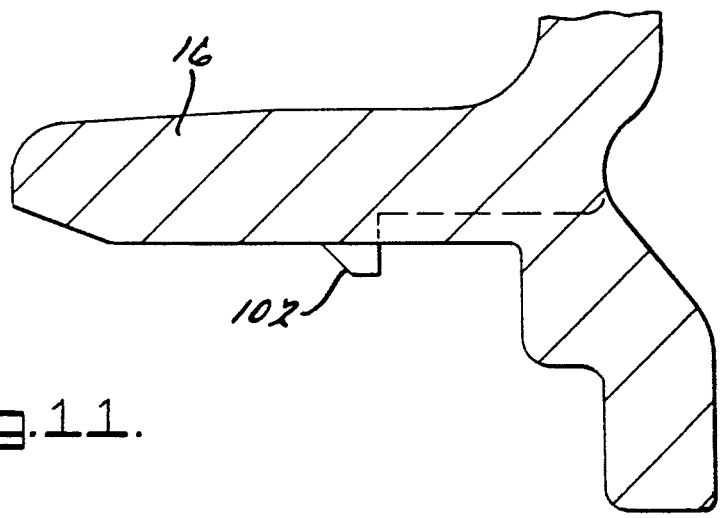
FIG. 11 is a cross-sectional view of an alternate configuration for a housing or engine cover as in FIG. 1.

Referring now to the drawings, FIGS. 1, 2 and 3 show an engine cover 10 having a port 12 for a crank shaft (not shown). Such engine covers have been made from a number of different materials, primarily steel, that are capable of withstanding the heat and stress that is generated by an automotive engine. However, in order to increase the strength-to-weight ratio, more recently aluminum has been used in the manufacture of engine covers. Still more recent advances have allowed the engine cover to be manufactured from molded plastic, and it is particularly to this plastic engine cover construction to which the invention is directed, although it should be appreciated that the invention has similar utility to other types of engine cover constructions. It is preferred that the engine cover or housing 10 be injection molded in a single piece, preferably from a vinyl ester such as American Cyanamid CYGLAS® 695, but any suitable plastic or similar material is contemplated. In this manner no extra fasteners or assembly is required, which would increase the weight and labor costs. Further, the use of a plastic material reduces the amount metal-to-metal interface and greatly reduces the transmission of engine noise.

FIG. 4 shows a cross-section of the port 12 for the engine cover or housing 10 of the preferred invention. The port 12 comprises generally a radial flange 16 extending from the body of the engine cover or housing 18. The cylindrical flange 16 is supported by a plurality of ribs 20. Four protuberances 17 on the radial outward surface of flange 16 provide further structural support for the annular flange 16. Due to the improved locking arrangement of the present invention, the width of the flange 16 may be significantly reduced compared to the prior art, reducing the weight and material cost of the cover 18. Extending radially inwardly from the engine cover or housing body 18 are a series of four tabs 14. Each tab 14 has a first surface 22 generally parallel to the planer surface of the engine cover or housing 18; the surface 22 acts as a positive seal insertion stop. Each tab 14 also contains a second radially inwardly extending planar surface 24 generally parallel to the surface 18 of the housing. This second planar surface protects the seal lip and garter spring of the seal from damage during cover/seal installation over the crankshaft. The surface 22 also reduces the possibility of inadvertent improper insertion of the seal 32 past the port 12 and into the engine.

The annular flange 16 contains on its inner circumferential surface (inner diameter) a substantially smooth sealing surface 26. The sealing surface is preferably tapered toward the axially outer edge (air side) to facilitate the manufacturing process and to facilitate the insertion and the extraction of the seal 32. Axially inward of the sealing surface 26 is a grooved or counterbored portion 30 which extends between each of the tabs 14. As shown in FIG. 4, the grooves or counterbores 30 begin axially outward of the tabs 14.

FIG. 5 illustrates a section of the annual flange 16 through section B—B above which contains the groove or counterbore 30, where the section was not taken through one of the support ribs 20.

FIG. 6 illustrates a cross-section of the annular flange 16 taken through section C—C which shows the tab 14 and rib 20.

Referring now to FIGS. 7 and 8, a seal generally shown at 32 has an overall outer diameter slightly larger than the inner diameter of the bore 12 shown in FIGS. 1 through 6. The seal 32 comprises an elastomeric annular base member 34, preferably composed of a fluoro-elastomer rubber material, molded about a metallic annular shell or case 36 which contributes to the strength and stiffness of the seal 32. It is preferred to provide (8 sets of 3) nubs or anti-stick bumps (not shown) on the bottom or axial inward surface of the base for packaging, so seals will not stick together when roll packed, and notches 37 for mold locating pins (8 sets of 2) on the top or axial outward surface of the base for controlling the location of the metal shell or case 36 during the molding process. Depending from the base 34 is an annular arm 38 having therein a groove for receiving an annular coil spring 40. The annular spring 40 provides a spring tension in a radially inward direction to maintain the sealing surface 42 of the arm 38 in engagement with the crankshaft or other cylindrical member entering the housing through the port 12. Also depending radially inwardly from the arm 38 is a radial lip 44 which is more flexible than the sealing surface 42 and which tends to prevent containments from entering into the sealing surface defined at 42.

On the outer diameter of the base member 34 of the seal 32 are a pair of annular ribs 46 and 48. The rib 46 is a sealing rib and the outer diameter of the seal 32 at the rib 46 is slightly greater than the inner diameter of the bore at the sealing surface 26. Thus, the sealing rib 46 will be in compression when the seal 32 is installed within the bore 12 and provide sealing engagement within the bore. As shown in FIG. 9, the locking or retention rib 48 is also of an outer diameter slightly greater than the inner diameter of the sealing surface 26 of the bore 12 such that it can be compressed to conform to the inner diameter of the sealing surface 26 through installation. The outer diameter of the locking rib may be greater than the outer diameter of the sealing rib. Also, the outer diameter of the locking rib may be greater than the inner diameter of the locking surface. The seal 32 is inserted axially inwardly until the axial inner end 49 of the base member 34 abuts the surface 22 of the tabs 14 and the retention or locking rib 48 engages the groove or counterbore 30 as shown in FIG. 9. Once the locking rib 48 engages the groove or counterbore 30, it will decompress to its original outer diameter, which is greater than the inner diameter at the surface 26 and thereby resist movement in an axial outward direction through abutment of the axially outer edge of the 52 of the groove or counterbore 30. This locking arrangement further resists relative circumferential motion between the seal 32 and the engine cover 10, opposing the frictional force generated by the turning of the crankshaft. Again, the efficiency of the locking arrangement allows a reduction of the seal width, reducing the weight and material cost of the seal.

Referring now to FIG. 10, the figure illustrates a preferred configuration for the radially inward sealing surface 42. The sealing surface 42 has series of 63 ribs 50 equally spaced around its circumference, the ribs 50 being arranged in right hand helical configuration. Should any oil (or other fluid used) seep between the surface 42 and the crank shaft (or other cylindrical object), the rotation of the shaft will tend to move the oil in a clockwise direction (looking from the outer or air side of the engine cover 10), and the ribs will channel the oil back into the engine. Thus, there is a "pumping" action created by the rotation of the shaft. For applications requiring opposite rotation, the orientation of the ribs 50 would be reversed.

Figure 12:
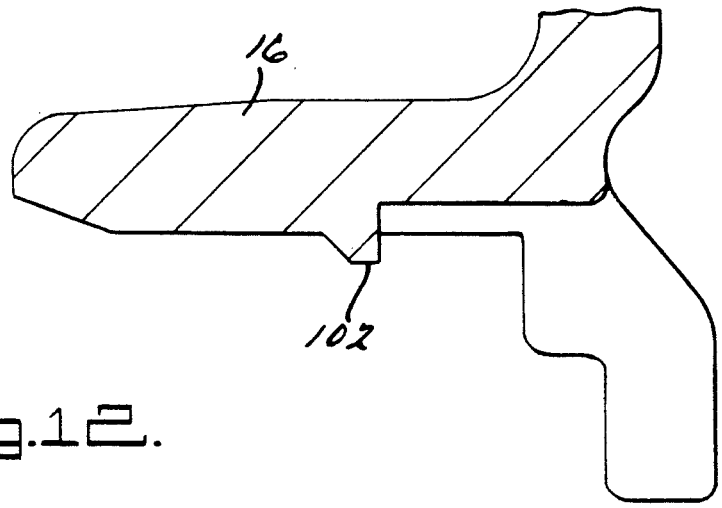
FIG. 12 is a cross-sectional view of the same embodiment illustrated in FIG. 11.
Figure 13:
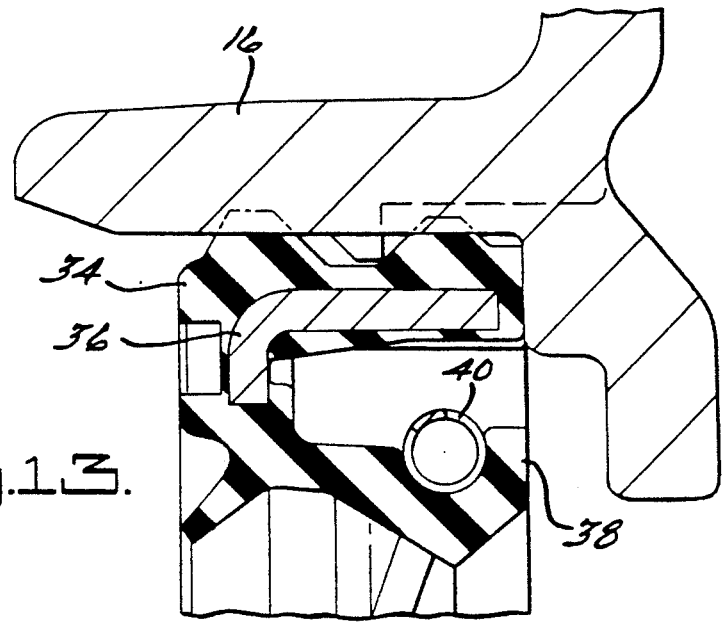
FIG. 13 is a cross-sectional view of a seal as illustrated in FIGS. 7 and 8 inserted into and in operational relationship with an engine cover as illustrated in FIGS. 11 and 12.

FIGS. 11, 12 and 13 illustrate another embodiment of the invention in which an annular protrusion 102 is molded into the inner diameter of the bore 16. All other aspects of the invention remain the same. However, in this embodiment, the outer diameter of the seal at the retaining rib 48 may be decreased slightly to facilitate insertion since the protrusion provides a greater locking force as the surface of the ledge 52 is increased by the addition of the protrusion 102. In this embodiment, the outer diameter of the rib 48 could actually be less than the inner diameter of the sealing surface 26.

The protrusion 102 allows for the de-flashing of the molded housing at the protrusion without cutting, scratching or damaging in any way the seal area 26. The extra step of die de-flashing eliminates any flash in the mold which may break off at seal installation which would then be a contaminant and could lead to seal failure. The die de-flashing process also allows for a sharp edge at the protrusion tip at the surface 52 which improves seal retention as opposed to an irregular or tapered edge.

Further, in the molding process, the edge of the mold cavity parting line wears over time, resulting in the formation of burrs. As the cavity opens the burrs will leave withdrawal marks, which over time may become deep enough to create an oil leak path. The protrusion 102 creates the smallest outer diameter for the bore and thus the mold cavity parting line would occur at this point, and the withdrawal marks would be located on the inner diameter of the protrusion 102 which is not a critical seal area.

The present invention has been described in an illustrative manner. It is to be understood that the terminology which has been used is intended to be in the nature of words or description rather than of limitation. Many modifications and variations are possible in light of the above disclosure. Therefore, within the scope of the attached claims, the present invention may be practiced otherwise than as specifically described.

What is claimed is:

1. A housing cover and seal assembly wherein:
said housing cover comprises a single piece construction having a first surface containing a cylindrical bore defined by an annular flange, said annular flange containing a plurality of circumferentially aligned radial grooves and said flange also having a circumferential sealing surface on its radially inner surface; and
said seal comprises an annular base member having a radially outwardly extending locking rib engaging at least one of said plurality of grooves in a locking arrangement.

2. The housing cover and seal assembly of claim 1 wherein said grooves are adjacent to said sealing surface.

3. The housing cover and seal assembly of claim 1 wherein said base member has a radially outwardly extending sealing rib axially spaced from said locking rib.

4. The housing cover and seal assembly of claim 3 wherein the outer diameter of said locking rib is greater than the inner diameter of said locking surface.

5. The housing cover and seal assembly of claim 4 wherein the outer diameter of said locking rib is greater than the outer diameter of said sealing rib.

6. The housing cover and seal assembly of claim 1 wherein said seal further comprises a sealing face on its inner circumference having a plurality of ridges about its circumference.

7. The housing cover and seal assembly of claim 6 wherein said ridges on said sealing face are equally spaced and parallel and are oriented diagonal to the axis of said seal.

8. The housing cover and seal assembly of claim 7 wherein said ridges are oriented and spaced such that the ribs axially overlap.

9. The housing cover and seal assembly of claim 6 wherein said seal further comprises a sealing member depending radially inwardly from said base member and said sealing face is located on said sealing member.

10. The housing cover and seal assembly of claim 1 wherein said flange further comprises a protrusion extending radially inwardly from said flange, said protrusion being adjacent to at least one of said grooves.

11. The housing cover and seal assembly of claim 10 wherein said protrusion is annular and is adjacent to each of said grooves.

12. The housing cover and seal assembly of claim 10 wherein said base member further has a radially outwardly extending sealing rib axially spaced from said locking rib.

13. The housing cover and seal assembly of claim 12 wherein the outer diameter of said sealing rib is greater than the inner diameter of said sealing surface.

14. The housing cover and seal assembly of claim 13 wherein the outer diameter of said sealing rib is greater than the outer diameter of said locking rib.

15. The housing cover and seal assembly of claim 1 wherein the outer diameter of said locking rib is greater than the inner diameter of said sealing surface.

16. The housing cover and seal assembly of claim 1 wherein said locking arrangement restricts relative motion between said housing cover and said seal assembly in both axial and circumferential directions.

17. A seal for use in combination with a sealing surface within the cylindrical bore of a housing cover, said seal comprising:
an annular base member;
at least one annular rib extending radially outwardly from said base member;
a sealing face on the inner circumference of said seal, said sealing face having a plurality of ridges uniformly spaced about its entire circumference;
said ridges being approximately the same length and parallel, and oriented diagonally of the axis of said seal.

18. The seal of claim 17 wherein said ridges are oriented and spaced such that the ridges axially overlap.

19. The seal of claim 17 further comprising an annular sealing member depending radially inwardly from said base member, said sealing face being located on said sealing member.

20. The seal of claim 17 further comprising:
an annular sealing member depending radially inwardly from said base member; and
a flexible annular lip depending radially inwardly from said base member and axially spaced from said sealing member.

21. The seal of claim 19 further comprising an annular biasing member biasing said sealing member radially inwardly.

22. The seal of claim 20 further comprising an annular biasing member biasing said sealing member radially inwardly.

23. A unitary engine cover for use with an O-ring seal having at least one radially outwardly extending rib, said engine cover comprising:
a surface defining a portion of a fluid containing chamber;
a port within said surface defined by an annular flange, said flange having a substantially smooth sealing surface on its inner diameter and a plurality of circumferentially aligned radial grooves.

24. The engine cover of claim 23 further comprising a plurality of tabs extending radially inwardly past said sealing surface.

25. The engine cover of claim 23 wherein said tabs have a plurality of axial surfaces.

26. The engine cover of claim 25 wherein said tabs are axially adjacent said grooves.

27. The engine cover of claim 26 wherein said tabs are circumferentially spaced between said grooves.

28. The engine cover of claim 23 further comprising a protrusion extending radially inwardly from said flange.

29. The engine cover of claim 28 wherein said protrusion is adjacent to at least one of said grooves.

30. A unitary engine cover for use with a removable O-ring seal having at least one radially outwardly extending rib, said engine cover comprising:
a surface defining a portion of a fluid containing chamber;
a port within said surface defined by an annular flange, said flange having a substantially smooth sealing surface on its inner diameter and at least one radially inwardly extending seal retaining member adjacent to said sealing surface, said seal retaining member having a first surface facing axially outwardly from said chamber for retaining said seal and a second distinct surface facing axially outwardly from said chamber and spaced axially inward and radially inward of said first surface to allow insertion of a seal removal tool.

31. The engine cover of claim 30 wherein said protrusion is annular.

32. A housing cover and seal assembly wherein:
said housing cover comprises a single piece construction having a first surface containing a cylindrical bore defined by an annular flange, said annular flange containing a plurality of circumferentially aligned radial grooves and said flange also having a circumferential sealing surface on its radially inner surface; and
said seal comprises a annular base member having a radially outwardly extending locking rib engaging at least one of said plurality of grooves in a locking arrangement, said locking rib having a rounded cross section at its axially outward edge.

* * * * *

UNITED STATES PATENT AND TRADEMARK OFFICE
CERTIFICATE OF CORRECTION

PATENT NO. : 5,329,898
DATED : July 19, 1994
INVENTOR(S) : John J. Nelson and Lawrence E. Bell It is certified that error appears in the above-indentified patent and that said Letters Patent is hereby corrected as shown below:   On the title page:

Item [73]   Assignee should be -- Freudenberg-NOK General Partnership --.

Signed and Sealed this

Tenth Day of January, 1995

Attest:

BRUCE LEHMAN

Attesting Officer    Commissioner of Patents and Trademarks